United States Patent Office 2,943,116
Patented June 28, 1960

2,943,116

CATALYTIC PROCESS FOR PREPARING 3,5- AND 3,6-DIMETHYLENECYCLOHEXENES AND MONOMERIC AND POLYMERIZED ISOMERIC MIXTURES THEREOF

Richard E. Benson, Claymont, Del., assignor to E. I. du Pont de Nemours and Company, Wilmington, Del., a corporation of Delaware No Drawing. Filed May 8, 1957, Ser. No. 657,703

13 Claims. (Cl. 260—666)

This invention relates to a new method of preparing unsaturated cyclic compounds, to novel isomeric mixtures of unsaturated cyclic compounds and their polymers. More particularly, this invention relates to a new catalytic method of preparing cyclic trienes, to novel isomeric mixtures of cyclic trienes obtainable by this method and to polymers of these isomeric mixtures.

Novel 3,5-dimethylenecyclohexenes, unsubstituted or substituted in the 1- or 2-positions or in both of these positions, are described and claimed in my copending patent application Serial No. 591,027, filed June 13, 1956. As described in said copending application, these unsubstituted and substituted 3,5-dimethylenecyclohexenes can be prepared by reacting allene and a monoacetylenic hydrocarbon in the presence of catalytic amounts of a nickel derivative of a weak acid having a dissociation constant below $9 \times 10^{-10}$, e.g., nickel acetylacetonate, nickel ethyl acetoacetate or nickel cyanide. However, the reaction using this type of catalyst does not produce dimethylenecyclohexenes wherein the methylene groups are in other than the 3- and 5-positions, such as the isomeric 3,6-dimethylenecyclohexene.

It is an object of this invention to provide a new method of preparing unsaturated cyclic compounds, novel isomeric mixtures of unsaturated cyclic compounds and polymers thereof. A further object is to provide a new catalytic method for preparing cyclic trienes, novel isomeric mixtures of cyclic trienes obtained by such method and polymers of these isomeric mixtures. A still further object is to provide a new catalytic process for preparing dimethylenecyclohexenes having methylene groups in the 3,5- or 3,6-positions. Another object is to provide novel isomeric mixtures of dimethylene-cyclohexenes which are isomerizable to m- and p-xylenes. An additional object is to provide novel isomeric mixtures of 3,5-dimethylenecyclohexene and 3,6-dimethylenecyclohexene and polymers of these isomeric mixtures which are useful as coatings. Other objects will appear hereinafter.

These and other objects of this invention are accomplished by the following process for preparing dimethylenecyclohexenes which comprises bringing into contact and reacting allene, at a temperature within the range of 25 to 150° C., with a monoacetylenic hydrocarbon in the presence of a catalytic amount of a nickel carbonyl/phosphite complex having the formula $$[(RO)_3P]_2Ni(CO)_2$$

where R is a hydrocarbon radical free from aliphatic unsaturation. It has now been found that dimethylenecyclohexenes, in particular 3,5- and 3,6-dimethylenecyclohexenes, having at most two substituents, these being hydrocarbon groups, preferably of one to six carbon atoms, attached to the cyclohexene ring carbon atoms in the 1- and 2-positions, are obtained by reacting, at a temperature in the range of 25-150° C. and under substationally anhydrous conditions, allene with a monoacetylenic hydrocarbon in intimate contact with catalytic amounts of a complex of nickel carbonyl with an organic phosphite, this complex having the formula $$[(RO)_3P]_2Ni(CO)_2$$

where R is a hydrocarbon radical free from aliphatic unsaturation.

When acetylene is employed as a reactant, there is obtained a novel isomeric mixture consisting essentially of 3,5-dimethylenecyclohexene and 3,6-dimethylenecyclohexene. This isomeric mixture is polymerizable to air-drying polymers suitable for such purposes as coating or impregnating. However, the monoacetylenic hydrocarbon reactant can be, in addition to acetylene, any mono- or di-substituted acetylenic hydrocarbon of the formula $R_1-C \equiv C-R_2$ wherein $R_1$ and $R_2$ are hydrogen or hydrocarbon radicals, such as alkyl, alkenyl, cycloalkyl or aryl, preferably of not more than six carbon atoms.

The reaction taking place in the process of this invention may be represented schematically by the following equations, where $R_1$ and $R_2$ are hydrogen or hydrocarbon radicals, preferably of no more than six carbon atoms:

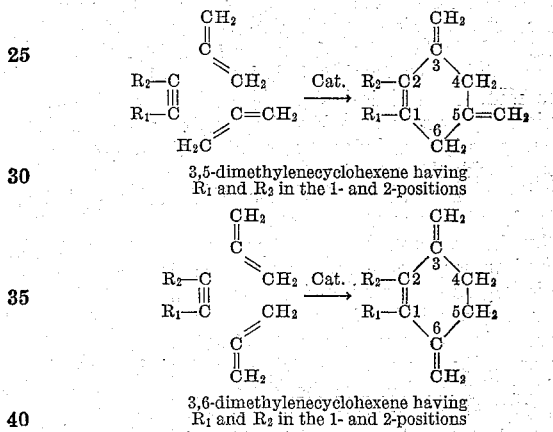

3,5-dimethylenecyclohexene having $R_1$ and $R_2$ in the 1- and 2-positions 3,6-dimethylenecyclohexene having $R_1$ and $R_2$ in the 1- and 2-positions The relative proportions of the two reactants are not critical. The method theoretically requires two moles of allene per mole of acetylenic reactant but these proportions need not be closely observed. It is generally desirable to use an excess of the acetylenic hydrocarbon, e.g., from 1.5 to 8 times the calculated amount.

The catalysts specifically effective for this reaction are the complexes of nickel carbonyl with organic phosphites, $(RO)_3P$, where R is a hydrocarbon radical free from aliphatic unsaturation, e.g., an alkyl, aryl, aralkyl or cycloalkyl radical, usually of not more than seven carbon atoms. The nickel carbonyl/phosphite complexes have the general formula $[(RO)_3P]_2Ni(CO)_2$. These nickel carbonyl/phosphite complexes have been described in the literature (Reed, J. Chem. Soc. 1954, 1940). The most stable of these complexes are those having the formula just given, which are prepared by the combination, with evolution of two moles of carbon monoxide, of two moles of the organic phosphite with one mole of nickel carbonyl. However, less well-defined complexes can be prepared by reacting more or less than two moles of phosphite with one mole of nickel carbonyl. The resulting products, containing complexes which may be represented by the formula $[(RO)_3P]_nNi(CO)_{4-n}$, where $n$ is a positive integer from 1 to 3, i.e. 1, 2 or 3, are also effective as catalysts in the process of this invention.

Illustrative catalysts suitable for use in the process of this invention ar bis(triphenyl phosphite)nickel dicarbonyl, bis-(tritolyl phosphite)nickel dicarbonyl, bis(trimethyl phosphite)nickel dicarbonyl, bis(tribenzyl phosphite)nickel dicarbonyl, bis(tricyclohexyl phosphite)nickel dicarbonyl, and the like. The bis(triaryl phosphite)

nickel dicarbonyls are in general preferred, particularly those in which the aryl radical has not more than seven carbon atoms. The catalyst need be used only in very small amounts, e.g., in amounts such that there is present from about 0.001 to 0.05 gram atom of nickel per mole of allene. Higher amounts can be used but it is unnecessary to do so.

The reaction proceeds best in the liquid phase, that is, in a liqid reaction medium. For this purpose, any substantially anhydrous organic liquid which is a solvent for the catalyst and which is inert, i.e. essentially unreactive with the reactants and reaction products can be used. The preferred reaction media are those compounds, liquid at ordinary temperatures, and preferably boiling below 150° C., which contain no active hydrogen atoms, i.e., which do not evolve gas in the Zerewitinoff test for active hydrogen. Suitable reaction media include the aromatic hydrocarbons (benzene, toluene, the xylenes, etc.), ethyl acetate, methylal, tetramethylene sulfone, tetrahydrofuran, dioxane, etc. The reaction should be carried out under substantially anhydrous conditions throughout.

While the reaction will proceed slowly at a temperature as low as 25° C., it is desirable in practice to operate at higher temperatures, in the range of 50–150° C., and preferably in the range of from 75–125° C.

The reaction can be carried at or near atmospheric pressure, for example by passing a mixture of allene and the acetylenic hydrocarbon through a suitable liquid medium containing the catalyst in solution, and recirculating the effluent gas if desired. This embodiment, which is particularly convenient when the acetylenic reactant is gaseous, permits continuous or semi-continuous operation and avoids the use of pressure vessels. Alternatively, however, the reaction can be carried out in sealed vessels, for example, at the autogenous pressure developed by the reactants at the temperature employed, or, if desired, under an added pressure of acetylenic reactant, when it is gaseous, or of an inert gas such as nitrogen. Thus, pressures varying from the autogenous pressure to 200 atmospheres, or even higher if desired, can be used. When operating in a closed vessel, the end of the reaction is indicated by the fact that there is no longer any appreciable fall of the internal pressure after the desired amount of acetylenic reactant has been introduced into the vessel.

When acetylene is the reactant, the crude reaction product, after removal of the solvent by distillation, is a complex mixture generally containing some undistillable, polymeric material. The distillable portion contains in substantial amounts a product of empirical formula $C_8H_{10}$, boiling at about 40° C. at 20 mm. pressure or 73–75° C. at 100 mm. pressure. This is a mixture consisting essentially (to the extent of about 98–99%) of 3,5- and 3,6-dimethylenecyclohexenes, in a ratio in the range between 40:60 and 60:40. The two isomers are not easily separable by distillation, but they can be separated by gas chromatography methods. However, for many uses it is not neecssary to separate the isomers.

The 3,6-dimethylenecyclohexene separated from the isomer mixture by gas chromatography is a colorless liquid having good thermal stability, considering its highly unsaturated nature. Alone or in admixture with the 3,5-isomer, it can be polymerized at low or moderate temperatures, e.g., in the range of −10 to 100° C., on exposure to air with or without a drying agent. The polymers are initially soluble in organic solvents such as the aromatic hydrocarbons, but on continued exposure they become rapidly insoluble in and unaffected by these solvents and tack-free. At this stage, the polymers are nearly colorless, transparent, hard and glossy. They are highly suitable for coating and impregnating purposes.

When acetylenic hydrocarbons other than acetylene are employed, the resulting reaction products are also complex mixtures. Spectral analyses generally indicate that the predominant component is the 1-substituted-3,5-dimethylenecyclohexene. Isomerization to aromatic compounds gives a mixture of 1-substituted-3,5-dimethylbenzene (in predominant amount) and 1-substituted-2,4-dimethylbenzene. The presence of the latter component indicates that the original reaction mixture contained either the 2-substituted-3,5-dimethylenecyclohexene or the 1-substituted-3,6-dimethylenecyclohexene, or both, since either component would give the same 1-substituted-2,4-dimethylbenzene on isomerization.

These substituted dimethylenecyclohexenes, as obtained and without separation, also polymerize on exposure to air to give solvent-insensitive polymers valuable for coating and impregnating purposes.

The following examples illustrate the invention.

*Example 1*

A 1-liter stainless steel pressure vessel was flushed with nitrogen and charged with 150 ml. of benzene and 5 g. of bis(triphenyl phosphite)-nickel dicarbonyl. The vessel was then cooled to −80° C. and 26 g. of allene was distilled into it, after which the vessel was allowed to warm up to room temperature, connected to a source of acetylene under pressure, and heated to 80° C. with agitation. After one hour the temperature inside the vessel rose suddenly to 140° C., and the pressure fell. Acetylene was repressured into the vessel at 100° C. until approximately 1.86 moles had been added over a period of two hours following the temperature rise. The vessel was then cooled, opened and the reaction product was distilled. After removal of the benzene there was obtained 17.2 g. of distillate, B.P. 40–60° C. at a pressure from 20 to 1 mm., chiefly 40° C. at 20 mm. A brown, viscous material (25 g.) remained in the still pot.

The reaction was repeated, using 80 g. of allene and 5 g. of catalyst, and approximately 3 moles of acetylene. The distillate (62.5 g.) from the reaction product was combined with that of the previous run and the combined product was redistilled through an efficient fractionating column to give 27.4 g. of liquid boiling at 73–75° C. at 104 mm. or at 42° C. at 25 mm., $n_D^{25}$ 1.5205–1.5321. A sample of the cut boiling at 75° C. at 104 mm., $n_D^{25}$ 1.5281, was found to have the empirical formula $C_8H_{10}$ and to contain three double bonds.

*Analysis.*—Calc'd. for $C_8H_{10}$: C, 90.56; H, 9.43; $H_2$/g. (3 double bonds), 0.057. Found: C, 90.89; H, 9.61; $H_2$/g., 0.052.

Infrared analysis indicated the presence of 3,5-dimethylenecyclohexene along with other components. Since separation by distillation was difficult, the mixture (cut boiling at 74–75° C. at 104 mm., $n_D^{25}$ 1.5253) was subjected to separation by gas chromatography, using the general technique described by N. H. Ray in J. Applied Chem. 4, 21 (1954). The instrument used was designed after the commercially available Perkin-Elmer vapor fractometer. A diatomaceous earth column saturated at room temperature with silver nitrate and operating at 80° C. was used, with the cell at 99° C., and the carrier gas was helium at a flow rate of 91 cc./min. With this apparatus the reaction product was separated into two major components. The first one (42% of the total) was shown by infrared, ultraviolet and nuclear magnetic resonance analysis to be 3,6-dimethylenecyclohexene. The second one (57% of the total) had the same retention time on the column as an authentic sample of 3,5-dimethylenecyclohexene under the same conditions, and its infrared and nuclear magnetic resonance spectra were identical with those of 3,5-dimethylenecyclohexene. There were also three other components present in the mixture, amounting altogether to about 1% of the total.

The identity of the reaction product of allene with acetylene was further established by isomerizing it to the aromatic compounds corresponding to 3,5- and 3,6-dimethylenecyclohexene. A sample of the reaction product (cut boiling at 71–73° C. at 104 mm., $n_D^{25}$ 1.5290) was refluxed in a nitrogen atmosphere with a catalytic amount of 10% palladium-on-charcoal for 8 hours. The resulting product was identified by infrared analysis as a mixture of m-xylene and p-xylene in approximately 50:50 ratio. The same result was obtained by warming the reaction product in chloroform solution with p-toluenesulfonic acid as the isomerization catalyst.

A thin layer on a glass plate of the initial reaction product, containing a small amount of a cobalt drying agent, was exposed to air at room temperature. After 16 hours, the liquid had polymerized to a solid dry to the touch, but still softened by toluene. Twenty-four hours later the polymeric film was entirely tack-free and insensitive to toluene. It was hard, transparent and had an attractive appearance.

*Example II*

Example I was essentially repeated, but on a larger scale. In two separate experiments a total of 160 g. of allene was reacted with approximately 6.35 moles of acetylene at 80–85° C. in the presence of 10 g. of bis(triphenyl phosphite)nickel dicarbonyl and 400 ml. of benzene. Distillation of the combined reaction products gave 91.5 g. (43% yield, based on the allene employed) of a mixture of 3,5- and 3,6-dimethylenecyclohexenes. Gas chromatography analysis indicated that this mixture contained approximately 41.5% of the 3,5-isomer and 57.5% of the 3,6-isomer.

*Example III*

A 4-neck flask was equipped with a stirrer, a reflux condenser, a thermometer and a gas inlet tube, which was adjusted to extend below the surface of the liquid. A solution of 5 g. of bis(triphenyl phosphite)nickel dicarbonyl in 250 ml. of toluene was placed in the flask, which was flushed with nitrogen, and the solution was heated to 80° C. with stirring. A mixture of allene (about 70 cc./min.), acetylene (about 122 cc./min.) and nitrogen (about 20 cc./min.) was passed through this solution at 80–105° C. for approximately 4 hours. At the end of this time a total of 64 g. of allene had been passed through the reaction vessel. Distillation of the reaction product gave 29.5 g. of a mixture of 3,5- and 3,6-dimethylenecyclohexene, B.P. 73–74° C. at 100 mm. Gas chromatography analysis indicated that the mixture contained agout 57.5% of the 3,5-isomer and about 40.5% of the 3,6-isomer.

*Example IV*

Using the procedure of Example I, a mixture of 60 g. of allene, 40 g. of methylacetylene, 5 g. of bis(triphenyl phosphite)nickel dicarbonyl and 150 ml. of benzene was heated in a pressure vessel at 80–85° C. until the internal pressure fell to 40 lb./sq. in. The reaction product was distilled and separated into a number of fractions. Analysis of the fraction (about 15 g.) boiling at 88–89° C. at 76 mm., $n_D^{25}$ 1.5122–1.5130, indicated that it was an addition product of one mole of methylacetylene with two moles of allene.

*Analysis.*—Calc'd for $C_9H_{12}$: C, 89.94; H, 10.07. Found: C, 87.02; H, 10.05.

Infrared analysis indicated that the product was chiefly 1-methyl-3,5-dimethylenecyclohexene, with some 2-methyl-3,5-dimethylenecyclohexene, some 1,3,5-trimethylbenzene and another unsaturate. Isomerization to aromatic compounds was carried out by heating 2 g. of the reaction product (fraction boiling at 88.5–88.8° C. at 76 mm., $n_D^{25}$ 1.5130) with 1 g. of 10% palladium-on-carbon at 170–175° C. in an atmosphere of nitrogen for 16 hours. A vigorous reaction occurred when the temperature reached 90° C., and then subsided. The isomerization product, $n_D^{25}$ 1.5010, was shown by infrared analysis to be a mixture of 1,3,5-tri-methylbenzene, which predominated, and 1,2,4-tri-methylbenzene.

*Example V*

A 4-necked, 500 cc. flask was equipped with a sealed stirrer, a gas inlet tube, thermometer, and a condenser. Toluene (150 ml.), 3 g. of bis(triphenyl phosphite)nickel dicarbonyl, and 5 g. of finely ground calcium carbide were placed in the flask, nitrogen was passed through the system, and the contents of the flask were heated to 70° C. Allene and methylacetylene were introduced at approximately 50 ml./min. and 70 ml./min., respectively. When the temperature reached approximately 110° C., reaction began as indicated by almost complete absorption of the gases. The reaction was run at about 105° C. for 3.5 hours at approximately equal allene and methylacetylene flow rates. A total of 25 g. of allene was passed into the reaction system. The reaction solution was cooled and filtered and a portion of it (about 100 ml.) was distilled through a 4-inch Vigreux column. The product boiling from 65° C./150 mm. to 60° C./0.5 mm. was redistilled through an efficient column. The higher boiling fraction, present in preponderant amount, was a mixture of 1- and 2-methyl-3,5-dimethylenecyclohexene similar to that obtained in Example IV.

While the process of this invention has been illustrated in the foregoing examples with reference to certain specific starting materials, other monoacetylenic hydrocarbons as defined above can be reacted with allene under the described conditions, including ethylacetylene, n-propylacetylene, n-butylacetylene, isobutylacetylene, n-hexylacetylene, cyclohexylocetylene, vinylacetylene, phenylacetylene, dimethylacetylene, diethylacetylene, diphenylacetylene, and the like. The products obtained from these reactants are mixtures of isomeric dimethylenecyclohexenes containing the 1- or 2- or 1,2-substituted-3,5-dimethylenecyclohexenes corresponding to the acetylenic hydrocarbon, e.g., 1- and 2-ethyl-3,5-dimethylenecyclohexene, 1- and 2-phenyl-3,5-dimethylenecyclohexene, 1,2-dimethyl-3,5-dimethylenecyclohexene, etc. Other components may be present in the reaction products, including the 1- and 1,2-substituted-3,6-dimethylenecyclohexenes, such as the 1-alkyl and 1,2-dialkyl-3,6-dimethylenecyclohexenes, particularly wherein alkyl is one to six carbon atoms, i.e. methyl to hexyl. The more accessible and preferred acetylenic reactants are those hydrocarbons which apart from the triple bond, are free from aliphatic unsaturation, and especially the monsubstituted acetylenes of the formula R–C≡CH where R is hydrogen or a hydrocarbon radical having from one to six carbon atoms and free from aliphatic unsaturation. Particularly useful as reactants are acetylene and monoalkyl monoacetylenes where the alkyl group has one to six carbon atoms. With the monoalkylacetylenes there are obtained the 1-alkyl and 2-alkyl-3,5-dimethylenecyclohexenes and 1-alkyl-3-methylene-cyclobutenes, such as those wherein the alkyl radical has one to six carbon atoms, i.e. wherein alkyl is methyl to hexyl. There may be present also 1-alkyl-3,6-dimethylenecyclohexenes.

As has been shown, 3,6-dimethylenecyclohexene is useful as a source of p-xylene through its ready isomerization to this compound. As is known, p-xylene is an important industrial chemical, one of its uses being as a source, by oxidation, of terephthalic acid which is a starting material in the synthesis of polyesters such as polyethylene terephthalate. For this purpose, it is not necessary to separate 3,6-dimethylenecyclohexene from its 3,5-isomer, since the isomer mixture can be isomerized to a mixture of m- and p-xylenes and the latter oxidized to a mixture of isophthalic and terephthalic acids, which mixture as such is a valuable starting material for polyesters.

3,6-dimethylenecyclohexene is further useful through its oxidation, e.g., with ozone, to the technically valuable succinic acid. Further utility of 3,6-dimethylenecyclohexene lies in its aptitude to polymerize, alone or mixed with the 3,5-isomer, to air-drying polymers valuable for use as protective coatings on substrates such as steel, or as impregnating layers for porous materials such as textiles, or as self-supported sheets.

The products obtained from allene and substituted acetylenes are also technically useful. For example, the 1- and 2-hydrocarbon-substituted-3,5-dimethylenecyclohexenes are readily isomerized e.g., with a palladium catalyst, to substituted dimethylbenzenes which are valuable chemicals, for example as intermediates in the synthesis of artificial musks.

Moreover, the isomeric mixtures obtained from allene and substituted acetylenes are polymerizable as such to air-drying polymers suitable for such purposes as coating or impregnating.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing dimethylenecyclohexenes having a methylene group in the 3-position and the other methylene group in one of the positions 5 and 6, which comprises bringing into contact and reacting allene, at a temperature within the range of 25 to 150° C., with a monoacetylenic hydrocarbon in the presence of a catalytic amount of nickel carbonyl/phosphite complex having the formula $[(RO)_3P]_nNi(CO)_{4-n}$ wherein R is a hydrocarbon radical free from aliphatic unsaturation and $n$ is a positive integer from 1 to 3.

2. Process for preparing dimethylenecyclohexenes having a methylene group in the 3-position and the other methylene group in one of the positions 5 and 6, which comprises bringing into contact and reacting allene, at a temperature within the range of 25 to 150° C., with a monoacetylenic hydrocarbon in the presence of a catalytic amount of nickel carbonyl/phosphite complex having the formula $[(RO)_3P]_2Ni(CO)_2$ wherein R is a hydrocarbon radical free from aliphatic unsaturation.

3. Process for preparing 3,5- and 3,6-dimethylenecyclohexenes which comprises bringing into contact and reacting allene, at a temperature within the range of 25 to 150° C., with acetylene in the presence of a catalytic amount of nickel carbonyl/phosphite complex having the formula $[(RO)_3P]_2Ni(CO)_2$ wherein R is a hydrocarbon radical free from aliphatic unsaturation.

4. Process for preparing dimethylenecyclohexenes having a methylene group in the 3-position and the other methylene group in one of the positions 5 and 6, which comprises bringing into contact and reacting allene, at a temperature within the range of 25 to 150° C., with a monoacetylenic hydrocarbon in the presence of a catalytic amount of bis(triphenyl phosphite)nickel dicarbonyl.

5. Process for preparing 3,5- and 3,6-dimethylenecyclohexenes which comprises bringing into contact and reacting allene, at a temperature within the range of 25 to 150° C., with acetylene in the presence of a catalytic amount of bis(triphenyl phosphite)nickel dicarbonyl.

6. The process for preparing 3,5- and 3,6-dimethylenecyclohexenes as set forth in claim 5 wherein said temperature is within the range of 50 to 150° C.

7. Process for preparing 3,5- and 3,6-dimethylenecyclohexenes as set forth in claim 5 wherein said temperature is between 75 and 125° C.

8. Process for preparing 3,5- and 3,6-dimethylenecyclohexenes which comprises bringing into contact and reacting allene, at a temperature within the range of 25 to 150° C., with acetylene in a substantially anhydrous inert liquid organic reaction medium and in the presence of a catalytic amount of nickel carbonyl/phosphite complex having the formula $[(RO)_3P]_2Ni(CO)_2$ wherein R is a hydrocarbon radical free from aliphatic unsaturation.

9. Process for preparing 3,5- and 3,6-dimethylenecyclohexenes which comprises bringing into contact and reacting allene, at a temperature within the range of 25 to 150° C., with acetylene in a substantially anhydrous inert liquid aromatic hydrocarbon reaction medium and in the presence of a catalytic amount of bis(triphenyl phosphite)nickel dicarbonyl.

10. Process for preparing alkyl-3,5-dimethylenecyclohexenes which comprises bringing into contact and reacting allene, at a temperature within the range of 25 to 150° C., with a monoalkyl monoacetylene wherein the alkyl group is of one to six carbon atoms in the presence of a catalytic amount of nickel carbonyl/phosphite complex having the formula $[(RO)_3P]_2Ni(CO)_2$ wherein R is a hydrocarbon radical free from aliphatic unsaturation.

11. Process for preparing methyl-3,5-dimethylenecyclohexenes which comprises bringing into contact and reacting allene, at a temperature within the range of 25 to 150° C., with methylacetylene in the presence of a catalytic amount of bis(triphenyl phosphite)nickel dicarbonyl.

12. An air-drying composition comprising an isomeric mixture consisting essentially of 3,5-dimethylenecyclohexene and 3,6-dimethylenecyclohexene.

13. A composition insoluble in organic solvents comprising an oxidatively dried polymerized isomeric mixture of 3,5-dimethylenecyclohexene and 3,6-dimethylenecyclohexene.

References Cited in the file of this patent

UNITED STATES PATENTS

| 2,481,742 | Hagemeyer | Sept. 13, 1949 |
| 2,686,209 | Reed | Aug. 10, 1954 |
| 2,723,299 | Tanaka et al. | Nov. 8, 1955 |
| 2,781,408 | Witt et al. | Feb. 12, 1957 |

OTHER REFERENCES

Ladbury et al.: Jour. Chem. Soc. (British), 1954, pp. 3885–86.

Bailey et al.: Jour. Amer. Chem. Soc., vol. 77, Jan. 5, 1955, pp. 73–75.